United States Patent [19]

Fiumefreddo et al.

[11] Patent Number: 4,504,108
[45] Date of Patent: Mar. 12, 1985

[54] WIRING DEVICE FOR MOUNTING ON SHEET METAL

[75] Inventors: John Fiumefreddo, Colonia, N.J.; Julius F. Tibolla, Yardley, Pa.

[73] Assignee: Challenger Circle F, Inc., Trenton, N.J.

[21] Appl. No.: 533,679

[22] Filed: Sep. 19, 1983

[51] Int. Cl.³ .............................................. H02B 1/02
[52] U.S. Cl. ................................ 339/128; 339/125 R; 339/126 R
[58] Field of Search .............................. 339/125–128; 248/558, 27.3

[56] References Cited

FOREIGN PATENT DOCUMENTS 274256 11/1965 Australia .............................. 339/128
2104735 3/1983 United Kingdom ................ 339/128

Primary Examiner—Eugene F. Desmond
Attorney, Agent, or Firm—Sperry, Zoda & Kane

[57] ABSTRACT

A wiring device may be mounted to sheet metal three ways and in two orientations. The device includes a flange for screw mounting, barbs for snap-in mounting, and a switched prong and leg arrangement for sliding the device on a punched notch and locking the device to the metal by the prongs engaging a hole in the sheet metal.

3 Claims, 3 Drawing Figures

WIRING DEVICE FOR MOUNTING ON SHEET METAL

BACKGROUND OF THE INVENTION

This invention pertains to wiring devices and more particularly is concerned with means for mounting wiring devices on sheet metal.

Wiring devices, of which lampholders are examples, are usually designed to be mounted in a particular way and orientation. Such devices are known to have flanges with mounting holes so that the device can be screwed to sheet metal with self-tapping screws. Other devices are known which "snap-in" punched holes engaging sheet metal between resilient barbs and flanges. With both arrangements the device is always mounted with the sheet metal parallel to the plane of the flange.

For a better understanding of the present invention, together with advantages and capabilities thereof, reference is made to the following disclosure and appended claims in connection with the above-described drawings.

DESCRIPTION OF THE INVENTION

Figure 1:
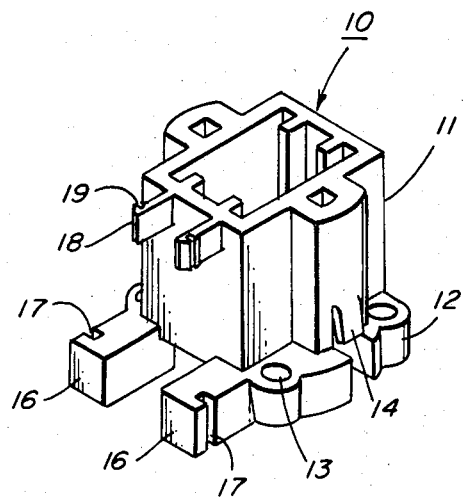
FIG. 1 shows an exemplary wiring device embodying the invention.

FIG. 1 is a view of a wiring device embodying the invention. The device 10 has a one-piece body 11 molded from a resilient thermoplastic such as a polyester sold under the trademark "VALOX" by the General Electric Company. The exact shape is determined by its use. The embodiment illustrated as way of example is a lampholder for a compact fluorescent lamp. Electric contacts, not shown, are arranged internal to the body in a known manner.

A flange 12 is located at one end of the body 11. The flange 12 has mounting holes 13 for screw mounting the device to sheet metal. Resilient barbs 14 are arranged on opposite sides of the body proximate to flange 12. The space between the end of the barbs 14 and the flange 12 is approximately the same as the thickness of the metal (e.g., about 0.036 inches for 20 gauge) on which the device is to be mounted.

Figure 2:
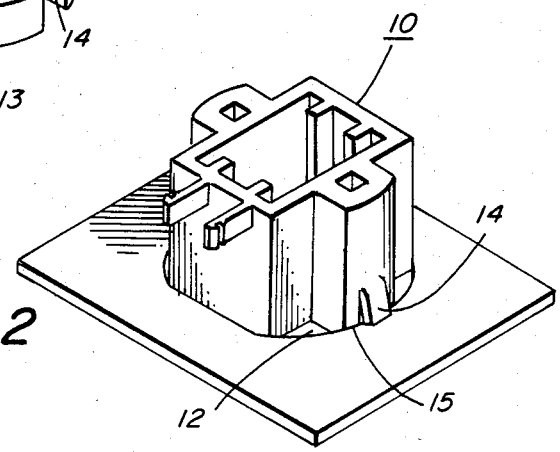
FIG. 2 shows the device of FIG. 1 mounted on sheet metal in a snap-in rear panel configuration.

In FIG. 2 it is seen that instead of being screw mounted the same device 10 may be inserted through a punched hole in sheet metal until the device is locked in place with the edge 15 of the sheet metal hole captured between the barbs 14 and the flange 12.

Figure 3:
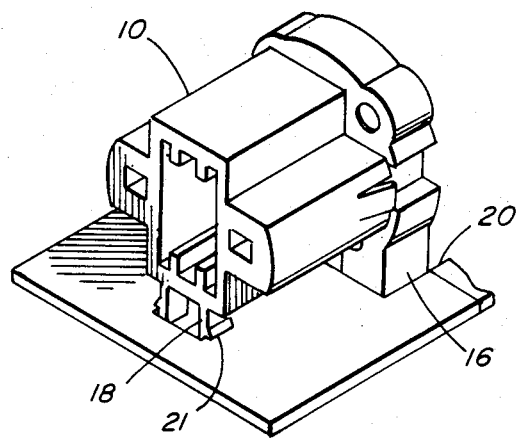
FIG. 3 shows the device of FIG. 1 mounted on sheet metal in a horizontal slide configuration.

Returning briefly to FIG. 1, there is seen legs 16 extruding from one side of the flange 12. Legs 16 have notches 17. Extending from the body 11, near the end opposite the flange, are prongs 18 having notches 19. The notches 17, 19 on the legs 16 and prongs 18 are equally distanced from a side of the body 11 and are dimensioned to grip edges of the sheet metal. To accept this arrangement, the sheet metal is punched with a notch 20 and a hole 21 as shown in FIG. 3. The device 10 is mounted by slightly cocking it and sliding the notches in or the legs 16 along the edge of the punched notch 20 until the prongs 18 are aligned with holes 21. The prongs are then pushed into hole 21 until notches 19 engage the sheet metal, thereby locking the device to the metal.

The wiring device may be mounted to sheet metal three ways and in two orientations. In one way self-tapping screws are used. In two ways, no additional hardware is used.

While there has been shown and described what is at present considered the preferred embodiment of the invention, it will be obvious to those skilled in the art that various changes and modifications may be made therein without departing from the scope of the invention as defined by the appended claims.

I claim:

1. A wiring device for mounting on sheet metal comprised of
    a body;
    a flange at one end of said body, said flange having holes for screws affixed to said sheet metal;
    at least one barb extending from said body in proximity to said flange for engaging the edges of a hole in the sheet metal between said barb and said flange;
    at least one leg extruding from said flange; and
    at least one prong extending from said body, said flange and legs having notches for engaging openings in said sheet metal.

2. The device of claim 1 wherein said body flange, legs and prongs are molded in one piece of resilient thermo-plastic.

3. The device of claim 1 wherein said notches are equally positioned from a side of said body.

* * * * *